United States Patent [19]

Strehl

[11] 4,287,591
[45] Sep. 1, 1981

[54] COMMUNICATIONS TRANSMISSION SYSTEM

[75] Inventor: Herbert Strehl, Munich, Fed. Rep. of Germany

[73] Assignee: Siemens Aktiengesellschaft, Berlin & Munich, Fed. Rep. of Germany

[21] Appl. No.: 50,327

[22] Filed: Jun. 20, 1979

[30] Foreign Application Priority Data

Jun. 20, 1978 [DE] Fed. Rep. of Germany ....... 2827040

[51] Int. Cl.³ .............................................. H04J 3/16
[52] U.S. Cl. ...................................... 370/83; 370/84
[58] Field of Search ...................... 370/83, 84, 11, 110

[56] References Cited

U.S. PATENT DOCUMENTS

| | | | |
|---|---|---|---|
| 3,046,346 | 7/1962 | Kramer | 370/84 |
| 3,748,393 | 7/1973 | Baxter | 370/84 |
| 3,790,715 | 2/1974 | Inose et al. | 370/84 |
| 3,988,545 | 10/1976 | Kuemmerle et al. | 370/83 |
| 4,115,662 | 9/1978 | Guinet et al. | 370/83 |

Primary Examiner—Douglas W. Olms
Attorney, Agent, or Firm—Hill, Van Santen, Steadman, Chiara & Simpson

[57] ABSTRACT

The present invention relates to a communications transmission system wherein there is superposed, on the conventional analog telecommunication network, a digital network whose digital local exchanges are connected with digital subscriber stations. Both networks are interconnected between the analog and digital local exchanges by way of analog/digital converters and digital/analog converters. In each digital subscriber station, a data transmission is possible simultaneously with voice transmission due to an automatic sub-channel formation by means of a multiplexer and a demultiplexer. An arrangement is provided for data clock pulse recognition to determine at which bit rate the respective data terminal operates, and causes a suitable sub-channel for the data to be arranged with a bit rate which is obtained from the voice channel.

1 Claim, 3 Drawing Figures

COMMUNICATIONS TRANSMISSION SYSTEM

BACKGROUND OF THE INVENTION

1. Field of the Invention

The present invention relates to a communications system for transmission, by way of connecting wires and/or a wireless medium, voice, music, text, images and data with a conventional telecommunications network for analog transmission and also segmented digital transmission with local exchanges and transit exchanges, comprising an additional network, superposed on the analog network, for pure digital transmission with its own transit exchanges (long distance network), and comprising digital local exchanges which are connected directly to digital subscriber stations, manifesting analog/digital converters and digital/analog converters, on the one hand, and which are connected, for every transmission connection to be established beyond the local area, either directly to the digital long distance network or to the analog network by way of the analog/digital converters and the digital/analog converters or, in the case of connection to a segmented digital transmission network, by way of a code converter, on the other hand, and comprising digital subscriber stations which constantly, or intermittently, utilize a portion of the bit current, available for voice transmission, for data transmission and/or signaling purposes.

2. Description of the Prior Art

A communications transmission system of this type is described, for example, in an application for United States Letters Patent, Ser. No. 915,051, filed June 12, 1978, which renders possible, in addition to voice transmission, also business teleprinting, telecopying, telephone-individual image transmission, or electronic letter transmission by way of digital subscriber stations. It is possible that constantly, or intermittently, a portion of the bit current available for voice transmission is utilized for data transmission and/or signaling purposes.

SUMMARY OF THE INVENTION

It is therefore the primary object of the invention to provide a new and improved system as a practical solution for handling both analog and data signals in such a composite system.

Beginning with a telecommunications transmission system of the type generally described above, this object is achieved, according to the present invention, by the provision of, in every digital subscriber station, a sub-channel multiplexer whose first input is connected, by way of a pulse modulator, to a microphone, and whose second input is connected, by way of a buffer memory, to a data input, and whose output is connected to the station output. A data clock pulse recognition device is provided having an input which is connected to a data input and an output which is connected, by way of a synchronous word generator, to a third input of the sub-channel multiplexer. A data word generator is provided having a first input which is connected to the output of the data clock pulse recognition circuit, having a second input which is connected to a second output of a bit and word clock pulse generator and having an output which is connected to the station output. A sub-channel demultiplexer is provided whose input is connected, by way of a delay circuit, to the input of the station, and which has a first output which is connected by way of a switch and a pulse demodulator to a receiver, and a second output which is connected with a data output. A data word comparator is provided having an input connected to the station input, a first output connected to control inputs of the buffer memory and to the switch, and a second output connected to a first input of the bit and word clock pulse generator. The latter has a second input which is connected to the station input and a first input which is connected to the clock pulse inputs of the sub-channel demultiplexer, the pulse modulator, and the pulse demodulator.

With the above structure, data bits are transmitted, instead of speech bits, at defined locations in the bit current, whereby the number of such locations is dependent upon the respective data clock pulse frequency.

However, the present invention can be advantageously utilized not only in the case of a system of the type set forth above, but also in the case of a purely digital system.

For a practical realization with pulse code modulation or pulse delta modulation, it is advantageous if a microprocessor and a freely addressable read only memory are provided which assume the functions of the sub-channel multiplexer, the data clock pulse recognition device of the synchronous word generator, the data word generator, the sub-channel demultiplexer, the data word comparator and the bit and word clock pulse synchronization device.

Although this embodiment is equally suited for pulse code modulation and pulse delta modulation, there are nonetheless some differences resulting for an even more detailed embodiment.

Since, in the case of pulse code modulation, a word structure is present in any case, the sub-channel synchronization can be derived from the word synchronization. The slightest speech influencing (or modulation) through the simultaneous state of transmission then occurs when, for the sub-channel formation, only the bits with the lowest significance are utilized; in the case of the PCM norm of the CCI, these are, for example, the eighth or the seventh and the eighth bit or bits, respectively, of a word.

If, instead of the derived data bits, filler bits with the value "zero" or "one" are inserted on the receiving side, the background noise occurring in the speech channel remains independent of the respective data signal. It would be conceivable to insert these filler bits with the aid of a logic circuit in such a manner that a minimum is obtained for the background noise.

In the case of delta modulation, a sub-channel synchronization must be inserted on the transmission side in order that the sub-channel be recognized on the receiving side and the data be derived. Of course, this permits a more unhampered sub-channel formation, better matched to the respectively required data transmission bit rate than in the case of pulse code modulation.

In the case of pulse delta modulation, it is advantageous if a pulse delta modulator is provided which has a feedback loop including an input for data arriving from the microprocessor.

In this arrangement, the influence of the sub-channel on the speech quality remains particularly small, because the interference effect of the data bits is automatically corrected by the delta modulator.

With the automatic sub-channel formation in accordance with the present invention, it is possible to increase the transmission capacity of the sub-channel to such an extent, as needed, that the fraction of the main channel, available for speech, becomes smaller than that of the sub-channel, for example, 16 kbit/s for the speech transmission, and 48 kbit/s for the data transmission. A complete, automatic transfer of the speech channel to data transmission is also possible.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
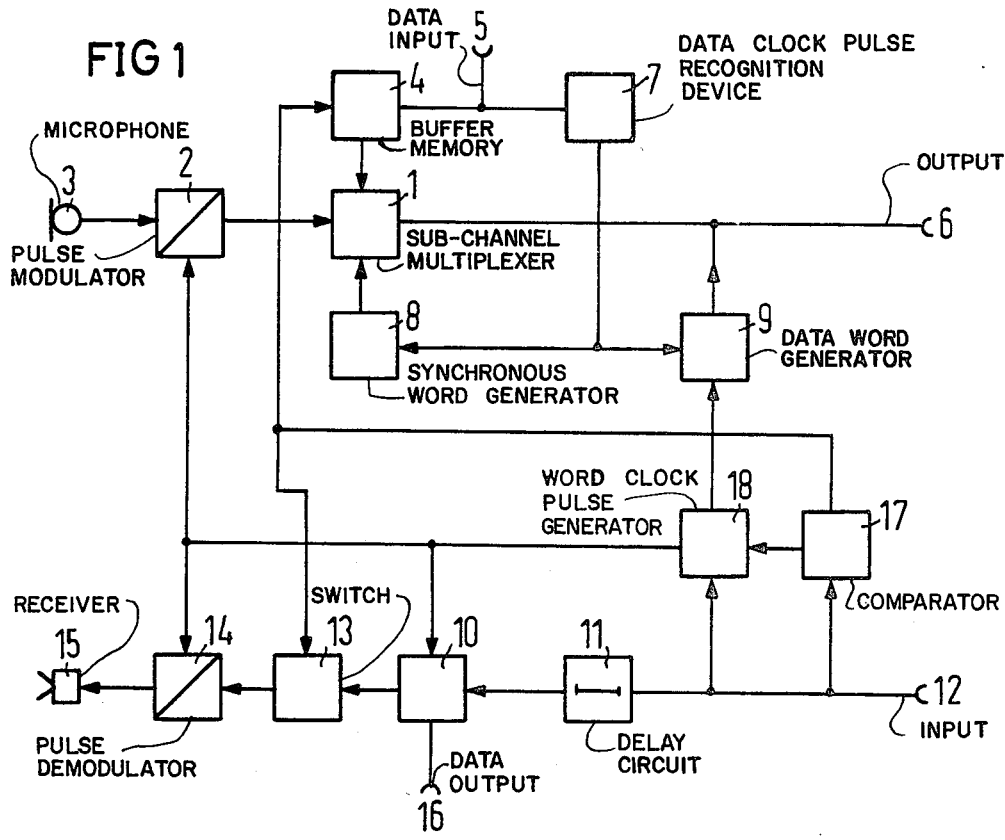
FIG. 1 is a schematic representation of an arrangement constructed in accordance with the present invention.

FIG. 1 illustrates a circuit arrangement constructed in accordance with the present invention which comprises a sub-channel multiplexer 1, a pulse modulator 2, a buffer memory 4, a data input 5, an output 6, a data clock pulse recognition device 7, a synchronons word generator 8, a data word generator 9, a sub-channel demultiplexer 10, an input 12, a switch 13, a pulse demodulator 14, a transmitter 3, a receiver 15, a data output 16, a data word comparator 17, and a bit and word clock pulse generator 18.

If only speech signals are to be transmitted, the analog signals originating from the microphone 3 are converted, in a pulse modulator 2, into PCM signals which reach the output 6 by way of the sub-channel multiplexer 1, on the one hand. Signals arriving at the input 12 are fed, by way of the delay circuit 11, the sub-channel demultiplexer 10 and the switch 13 to the pulse demodulator 14 which converts the PCM signals into analog signals for reproduction at the receiver 15.

If a data transmitting data terminal is connected to the data input 5, the data clock pulse recognition device 7 determines that the bit rate at the data input amounts to, e.g. 8 kbit/s, and controls the synchronous word generator 8 is such a manner that only the bit rate necessary for the data transmission in the sub-channel multiplexer 1 is removed from the speech channel. Simultaneously, it is communicated to the remote station, which is not illustrated, by constructed in precisely the same manner, by a data word from the data word generator 9, which data bit rate and which synchronous word is utilized in the sub-channel. Upon receiving an acknowledgment regarding the recognition of the sub-channel by the remote station, via the data word generator 17, the buffer memory 4 begins to output its data to the sub-channel multiplexer 1.

On the receiving side of the remote station, whose elements are the same as in FIG. 1, but designated herein with an *, and data word comparator 17* recognizes to which sub-channel bit rate and which synchronous word the synchronization must be adjusted, and causes the data word generator 9*, after engagement into the synchronous operation, to likewise deliver an acknowledgment. Incoming data are fed to the data output 16* by way of the sub-channel demultiplexer 10*.

If no more data arrive at the data input 5, the clearing of the sub-channel is brought about in the same manner by the data recognition device 7.

Through the delay circuit 11 and the switch 13, the data words, provided for the establishment of the sub-channel, and for other purposes, are prevent from reaching the pulse demodulator 14, in that otherwise noise can result in the speech channel.

A transmission of data from the remote station to the data output 16 proceeds in the same manner.

Figure 2:
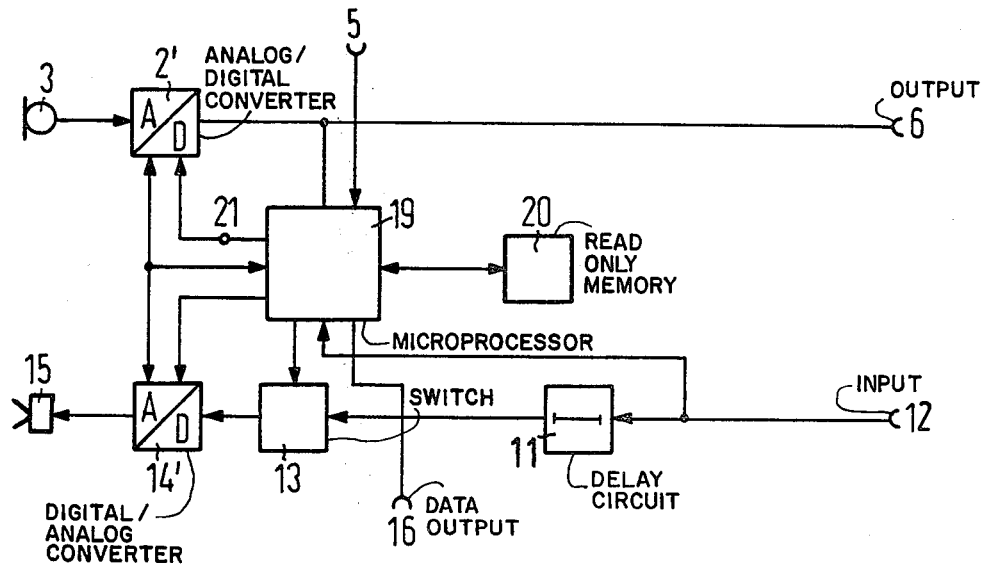
FIG. 2 is a schematic representation of an arrangement constructed in accordance with the present invention for pulse code modulation and pulse delta modulation.

FIG. 2 illustrates an arrangement according to FIG. 1 for pulse code modulation or pulse delta modulation wherein all functions, except those of an analog/digital converter 2', of the microphone 3, of a digital/analog converter 14', of the receiver 15, of the delay circuit 11, and of the switch 13, are executed by a microprocessor 19 of the type SBC 80/20, as manufactured by Siemens AG, and a freely addressable read only memory (ROM) 20.

Figure 3:
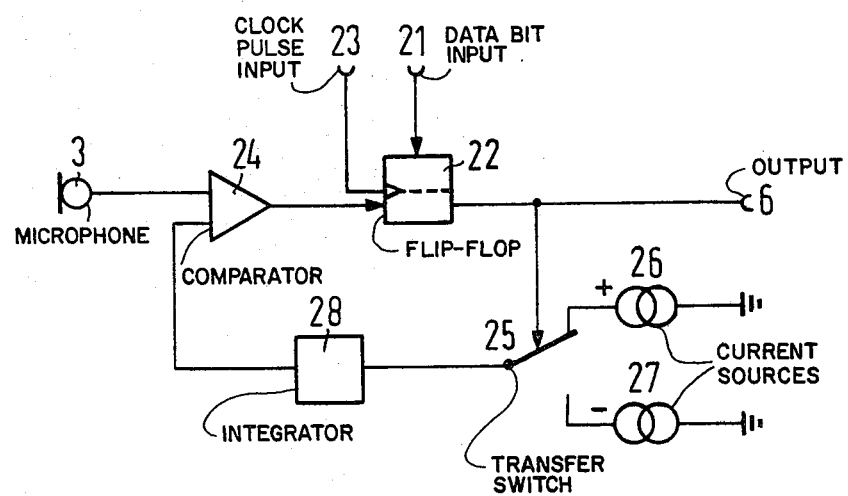
FIG. 3 is a schematic representation of a pulse delta modulator for an arrangement constructed in accordance with FIG. 2.

FIG. 3 illustrates a pulse delta modulator which can be employed in place of the analog/digital converter 2' in FIG. 2. The pulse delta modulator comprises a flip-flop 22 having a data bit input 21, which is also illustrated in FIG. 2, and with a clock pulse input 23, a comparator 24, a transfer switch 25, current sources 26 and 27, and an integrator 28.

The method of operation of the pulse delta modulator is known in the art. The comparator 24 compares whether the reference voltage delivered by the integrator 28 is greater than or smaller than the analog voltage originated from the microphone 3. Depending upon these conditions, a pulse is delivered, or not delivered, to the output 6. Depending upon the state of the output 6, the integrator 28, by way of the switch 25, is either charged by the current source 26 or discharged by the current source 27, in such a manner that the reference voltage occurring at the output of the integrator follows the analog voltage originating from the microphone 3. The data insertion by way of the flip-flop 22 into the feedback loop to the comparator 24 causes the influence of the sub-channel on the speech quality to remain particularly small, because the interference effect of the data bits is automatically corrected by the pulse delta modulator.

Although I have described by invention by reference to particular illustrative embodiments thereof, many changes and modifications of the invention may become apparent to those skilled in the art without departing from the spirit and scope of the invention. I therefore intend to include with the patent warranted hereon all such changes and modifications as may reasonably and properly be included within the scope of my contribution to the art.

I claim:

1. In a communications transmission system of the type in which pulse modulated analog signals and digital signals are transmitted between subscriber stations over a transmission medium, the improvement therein in which a subscriber station comprises:
   a speech microphone
   a speech receiver;
   a data input for receiving data;
   a data output for emitting data;
   a station output for connection to the transmission medium;

a station input for connection to the transmission medium;

a pulse modulator having a first input connected to said microphone, a second input and an output;

a sub-channel multiplexer having a first input connected to said pulse modulator, a second input, a third input, and an output connected to said station output;

a buffer memory having a first input connected to said data input, a second input and an output connected to said second input of said sub-channel multiplexer;

a data clock pulse recognition circuit having an input connected to said data input, and an output;

a synchronous word generator having an input connected to said output of said data clock pulse recognition circuit, and an output connected to said third input of said sub-channel multiplexer;

a data word generator having a first input connected to said output of said data clock pulse recognition circuit, a second input and an output connected to said station output;

a delay circuit connection to said station input;

a sub-channel demultiplexer having a first input connected to said station input via said delay circuit, a second input, a first output connected to said data output, and a second output;

a switch having a first input connected to said second output of said sub-channel demultiplexer, a second input, and an output;

a pulse demodulator having a first input connected to said output of said switch, a second input, and an output connected to said speech receiver;

a data word comparator including an input connected to said station input, a first output connected to said second input of said switch and said second input of said buffer memory, and a second output;

and a bit and word clock pulse generator including a first input connected to said station input, a second input connected to said second output of said data word comparator, a first output connected to said second input of said data word generator, and a second output connected to said second inputs of said pulse modulator and said pulse demodulator.

* * * * *